(12) United States Patent
Bogucki et al.

(10) Patent No.: US 6,684,986 B1
(45) Date of Patent: Feb. 3, 2004

(54) ADJUSTER MECHANISM FOR A DRUM BRAKE

(75) Inventors: Leon A. Bogucki, South Bend, IN (US); James E. Doolittle, Granger, IN (US); Kent A Woodiwiss, Goshen, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/249,330

(22) Filed: Apr. 1, 2003

(51) Int. Cl.$^7$ .......................... F16D 51/24; F16D 65/56
(52) U.S. Cl. ................ 188/79.51; 188/79.54; 188/196 BA
(58) Field of Search .................. 188/79.51, 79.54, 188/79.55, 79.56, 79.63, 196 B, 196 BA, 79.61, 79.62, 79.64

(56) References Cited

U.S. PATENT DOCUMENTS

| | | | |
|---|---|---|---|
| 4,061,211 A | * 12/1977 | Hoshino et al. | 188/79.54 |
| 4,645,040 A | * 2/1987 | Knott et al. | 188/79.54 |
| 5,067,596 A | * 11/1991 | Johannesen | 188/79.54 |
| 6,394,237 B1 | * 5/2002 | Asai | 188/79.51 |

* cited by examiner

*Primary Examiner*—Matthew C. Graham
(74) *Attorney, Agent, or Firm*—Leo H McCormick, Jr.; Warren Comstock

(57) ABSTRACT

An adjuster mechanism in a drum brake wherein a rotation of a star wheel on a shaft of an extendable strut is limited to a single increment define the pitch of a plurality of teeth on the star wheel. The limitation is achieved by a lever that is carried by a web of a brake shoe has a first blade that in perpendicular alignment with a first tooth of the plurality of teeth while a second blade is offset from a second tooth and located in a plane that is substantially parallel with the pitch. When the lever is pivoted on the web through a predetermined angle, the first blade slides into engagement with a third tooth while the second blade moves through the offset and into engagement with the second tooth to connect the lever with the star wheel. Any further pivoting of the lever by movement of the web toward the drum results in the lever and star wheel moving together. When a brake application terminated, a return spring acts on the lever to bring the first blade into engagement the third tooth while the second blade is moved to the offset position and the star wheel is rotated an increment defined by the pitch of the plurality of teeth such that a running clearance is sustained for the drum brake.

6 Claims, 2 Drawing Sheets

ADJUSTER MECHANISM FOR A DRUM BRAKE

BACKGROUND OF THE INVENTION

This invention relates to an a pawl for an actuator mechanism for a drum brake wherein an adjustment for a brake application is limited to an increment defined by a pitch of a plurality of teeth on a star wheel.

U.S. Pat. Nos. 4,220,227 and 4,502,574 disclose adjuster mechanism for use in a drum brake to control the extension of a strut member and define a running clearance between a friction surface on brake shoes and a drum member. In particular, the adjuster mechanism includes a pawl carried by a first brake shoe wherein a spring is connected to the pawl and the other brake shoe such that movement of the first brake shoe toward the drum causes the pawl to pivot on the first brake shoe. When a predetermined movement of the brake shoe occur as when lining wear occurs, the pawl pivots to an extent that a first edge moves past a tooth on a star wheel and when the brake application terminates, the first edge again engages the tooth and rotates the star wheel to cause an extension in the strut member. This type adjuster mechanism functions in an adequate manner for most operations, however, should the drum brake be operated under extreme conditions wherein an input force is applied to moves the friction surface on the brake shoe into engagement with the drum it is possible that the first edge on the pawl moves past several teeth on the star wheel. Now on return of the pawl to a rest position, a second edge engages the star wheel and rotates the star wheel through an arc corresponding to several teeth such that a desired running clearance is largely reduced or non-existent. If the running clearance is totally eliminated, the brake will drag until the friction lining is worn away through continued engagement with the drum. Thus, it is important to control the rotation of the star wheel so that the extendable strut is not over adjusted and the brake shoes are maintained with a desired running clearance with respect to the drum.

SUMMARY OF INVENTION

A primary object of the present invention is to provide a pawl for an adjuster mechanism that limits an adjustment of an extendable strut member to a single increment defined by a pitch of a plurality of teeth on a star wheel no matter how far an input force moves a brake shoe during a brake application.

According to this invention, the adjuster mechanism for a drum brake of a vehicle including an extendable strut that is located between a first web of a first brake shoe and a second web of a second shoe to define a running clearance between said first and second shoes and a drum. The first and second brake shoes are retained on a backing plate that is secured to the vehicle such that a first engagement end of the first web and the second web is aligned with an anchor on the backing plate and a second engagement end is spaced apart by an actuator member. A first spring attached to the first and second webs urges the first engagement ends toward the anchor while a second spring is attached to a lever of the adjuster mechanism that is retained on the first web and said second web. The second spring urges the second engagement ends toward the actuator member such that the first and second brake shoes are positioned with respect to the drum to define the running clearance when the actuator is in a rest position. The actuator responding to an input force by acting on the first and second webs in opposition to the first and second springs and moves the first and second brake shoes through the running clearance and into engagement with the drum to effect a brake application. The adjuster mechanism including a shaft with a star wheel located between a first threaded section and a smooth section with the smooth section being retained in a bore of a first body of the extendable strut while the first threaded section is mated a second threaded section in a second body of the extendable strut. The lever pivots on the first web with movement of the first web with respect to the actuator and rotates the star wheel when a predetermined pivotal movement occurs that causes a corresponding rotation of the first threaded section with respect to the second threaded section such that the extendable strut expands to maintain a desired minimum running clearance. The star wheel is characterized by a plurality of teeth while the lever is characterized by a base with a first slot for receiving a pivot pin secured to the first web for securing the base to the first web, an opening for receiving a first end of the second spring, a second slot for receiving a first end of the first body of the extendable strut and an arm extending from the base to align a first blade thereon in perpendicular alignment with a first tooth of the plurality of teeth on the star wheel and to align a second blade thereon in a plane that is substantially parallel with a pitch of a second tooth of the plurality of teeth on the star wheel. The first blade engages the first tooth with lever and first web are positioned in the rest position while the second blade is offset a distance from the second tooth. The base pivots on the pivot pin during a brake application and when the first web moves a predetermined distance toward the drum the lever will have pivoted through a predetermined angle such that first blade slides past the first tooth and moves into engagement with a third tooth adjacent said first tooth while said second blade moves through the offset distance and into engagement with said second tooth such that said lever is now locked into engagement with the star wheel. The first blade is thereafter prevented from moving past the third tooth and the lever and star wheel move together should the lever continue to pivot with further movement of the web toward the drum. When the input force terminates, the second spring return the lever to the position of rest and the first blade now engages the third tooth to rotate the star wheel an increment defined by the pitch of the plurality of teeth as the second blade moves away from the star wheel the offset distance. Thus, the rotation of the star wheel is limited to a single increment to prevent over adjustment of an extendable strut during a brake application.

An advantage of this invention resides in a means whereby a pawl is locked to a star wheel when a predetermine movement of a web member occurs such that any additional movement does not effect later the rotation of the star wheel to extend an extendable strut and set a running clearance between a friction surface and a drum.

DETAILED DESCRIPTION

Figure 1:
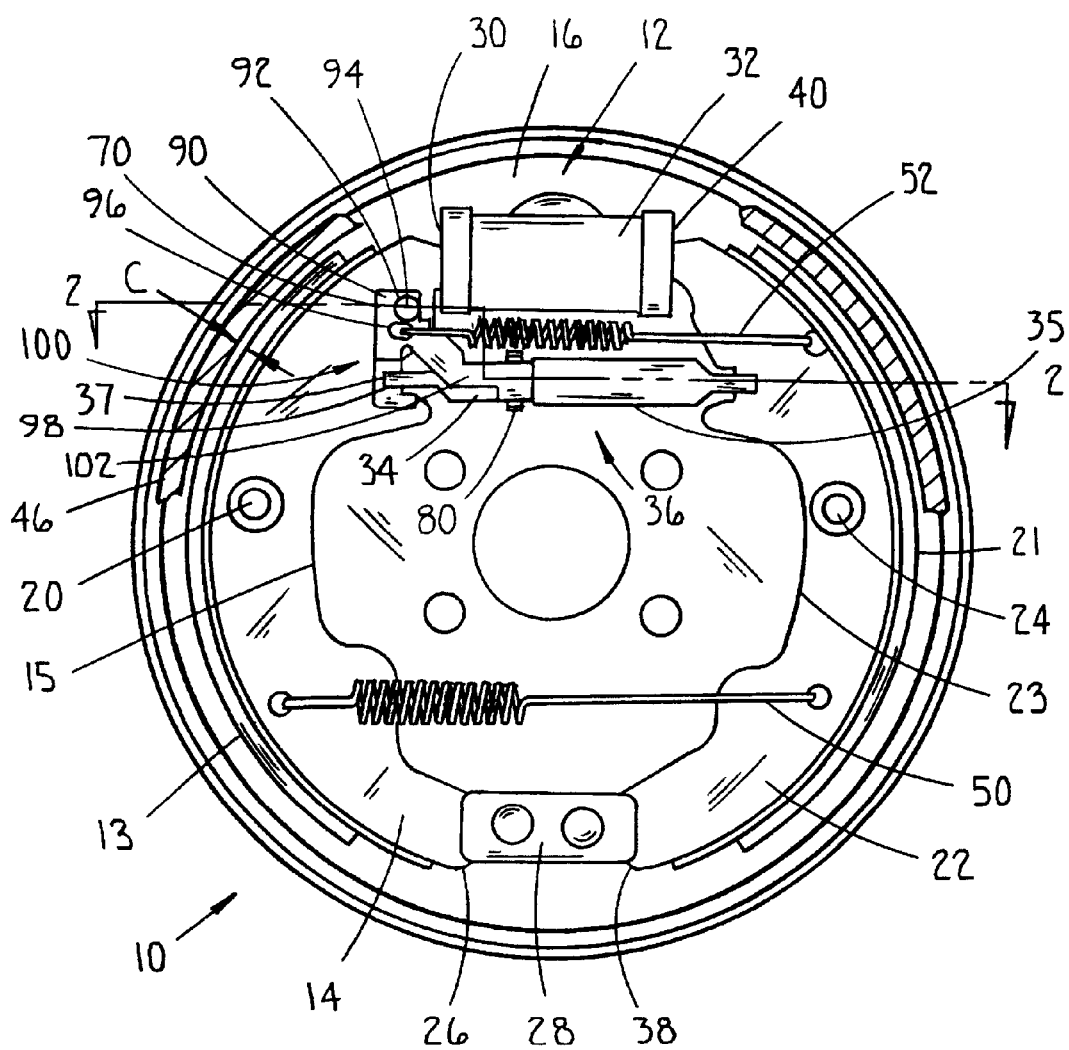
FIG. 1 is a schematic illustration of a drum brake for a vehicle having an adjuster mechanism with a pawl made according to the present invention.

The drum brake 10 shown in FIG. 1 for use in a vehicle includes an actuator assembly 12 for effecting a brake application. The drum brake 10 is of a general type as disclosed in U.S. Pat. No. 4,502,574 wherein a first brake shoe 14 is mounted on the backing plate 16 by a first spring clip and pin 20 and a second brake shoe 22 is mounted on the backing plate 16 by a second spring clip and pin 24. The first brake shoe 14 has a web 15 with a first engagement end 26 located in a guide slot on a projection of an anchor 28 on the backing plate 16 and a second engagement end 30 that is connected to wheel cylinder 32 included in the actuator assembly 12 and receives a first body or section 34 of an extendable strut 36. The second brake shoe 22 has a web 23 with a first engagement end 38 located in a guide slot on projection of the anchor 28 and a second engagement end 40 that is connected to wheel cylinder 32 and receives a second body or section 35 of the extendable strut 36. A first spring 50 attached to webs 15 and 23 urges the first engagement ends 26,38 toward anchor 28 while a second spring 52 that is attached to pawl 70 of the adjuster mechanism 100 and web 23 urges the second engagement ends 30,40 toward the wheel cylinder 32 such that the first 14 and second 22 brake shoes are positioned with respect to drum 46 to define a running clearance C when the actuator assembly 12 is in a position of rest. The running clearance C for the first 14 and second 22 brake shoes is determined by the length of the extendable strut 36 is located between webs 15 and 23.

Figure 2:
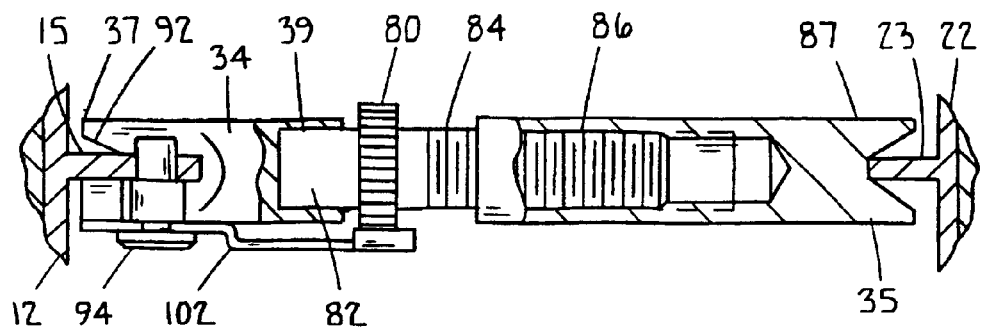
FIG. 2 is an sectional view taken along lines 2—2 of FIG. 1 showing an extendable strut for the adjuster mechanism.

The extendable strut 36, as best shown in FIG. 2, is defined by a star wheel member 80 that is located between a first body 34 and a second body 35. The first body 34 is essentially a cylindrical body having a first end 37 with a slot for receiving web 15 of brake shoe 12 and a second end with a bore or socket 39 therein for receiving a smooth shaft 82 of the star wheel member 80. The star wheel member 80 in addition to smooth shaft 82 has a threaded stem 84 that is mated with a threaded bore 86 in the second body 35. The second body 35 is essentially a cylindrical body with a slot 87 for receiving web 23 of brake shoe 22. The star wheel member 80 has a plurality of teeth with a uniform pitch wherein each tooth represents an equal arcuate segment or increment that establishes a limit for modifying the running clearance C during a single brake application.

Figure 3:
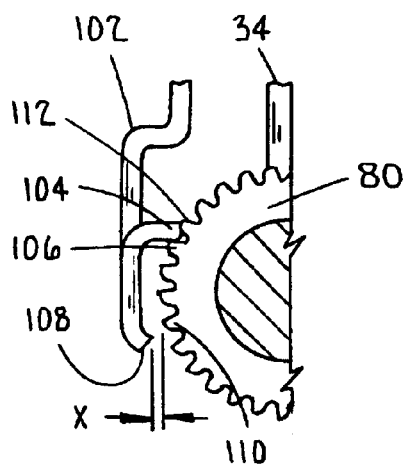
FIG. 3 is a view taken along lines 3—3 of FIG. 2 showing a relationship between a first blade and a second blade on the pawl with respect to teeth on a star wheel when the pawl is in a rest position.

The extendable strut 36, along with pawl 70, is part of the adjuster mechanism 100 and is defined a base 90 with a first slot 92 for receiving a pivot pin 94 secured to web 15 for securing or locating the base 90 on web 15, an opening 96 for receiving a first end of spring 52, a second slot 98 for receiving the first end 37 of the first body 34 of the extendable strut 36 and an arm 102 that extends from base 90 to align a first blade 104 thereon in perpendicular alignment with a first tooth 106 of the plurality of teeth on the star wheel 80 and to align a second blade 108 thereon in a plane that is substantially parallel with a pitch of a second tooth 110 of the plurality of teeth on the star wheel member 80. With the actuator mechanism 100 in a rest position, the pawl 70 and star wheel member 80 have a relationship as defined in FIG. 3 wherein the first blade 104 engages the first tooth 106 on pawl or lever 70 while the second blade 108 is offset a distance x from the second tooth 110. With this design, the distance between the first blade 104 and the second blade 108 is greater than the arcuate length between first tooth 106 and second 110 tooth but less that the arcuate length between second tooth 110 and a third tooth 112 that is adjacent to the first tooth 106. The second spring 52 acts on the base 90 to bias the extendable strut 36 into engagement with webs 15 and 23 and the second engagement ends 30 and 40 into engagement with wheel cylinder 32 to define the running clearance C.

The length of the extendable strut 36 may be altered by rotating star wheel member 80 on the first body 34 with respect to this second body 35 to establish and maintain a predetermined running clearance C between a first friction surface 13 on brake shoe 14, a second friction surface 21 on brake shoe 22 and the drum 46. The first brake shoe 14 is urged toward the second brake shoe 22 by the action of the first spring 50 that urges the first ends 26,38 toward the anchor post 28 and the second spring 52 that urges the second ends 30,40 toward wheel cylinder 32 and webs 15 and 23 with the length of the extendable strut 36 the factor that limits the movement of the second ends 30,40 toward the wheel cylinder 32.

Figure 4:
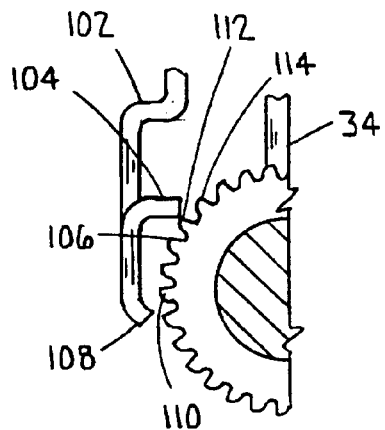
FIG. 4 is a view of the first and second blades on the pawl during a brake application.
Figure 5:
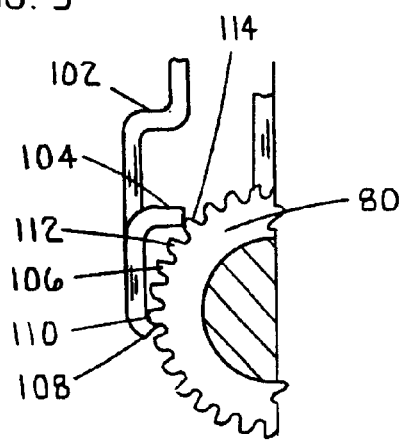
FIG. 5 is a view of the first and second blades associated with a predetermined pivoting of the pawl caused by movement of the brakes shoes in response to an input force supplied to effect a brake application.

A hydraulic input force from actuator assembly 12 is supplied to wheel cylinder 32 and acts on the second engagement ends 30 and 40 of webs 15 and 23 of the first 14 and second 22 brake shoes. After overcoming the force of springs 50 and 52, the input force moves the first 14 and second 22 brake shoes through the running clearance C to bring friction surfaces 13 and 21 into engagement with drum 46 to effect a brake application. As web 15 moves from the position of rest, base 90 of pawl 70 pivots on pin 94 such that first blade 104 slides toward the apex of the first tooth 110 as illustrated in FIG. 4 while at the same time the second blade 108 moves through the offset distance x toward the second tooth 110. If the distance that the web 15 moves exceed a predetermined distance, base 90 pivots sufficiently such that the first blade 104 moves past the apex of tooth 112 and toward tooth 114, however before blade 104 engages tooth 114 the second blade 108 engages tooth 110 to join the pawl 70 with the star wheel member 36 as shown in FIG. 5. Thereafter any further movement of base 90 by movement of web 15 toward drum 46 causes the pawl 70 and star wheel member 80 to move together. When the hydraulic input supplied to the wheel cylinder 32 terminates, the input force applied to the second engagement ends 30,40 also terminates and springs 50 and 52 return the first 14 and second 22 brake shoes to a rest position as illustrated in FIG. 1. As web 15 returns to the position of rest, spring 52 acts on base 90 of the adjustment mechanism to rotate pawl 70 to a position of rest such that the first blade 104 now engages tooth 112 and rotates the star wheel member 80 to a position where tooth 112 is perpendicular to the blade 104 rather than tooth 110 as illustrated in FIG. 2. The rotation of the star wheel member 80 is limited during a single brake application to an increment that is defined by the pitch of tooth 112 and as a result an over adjustment of the extendable strut 36 in establishing a running clearance x resulting from an hydraulic input force supplied to wheel cylinder 32 to effect a brake application.

What is claimed is:

1. An adjuster mechanism for a drum brake of a vehicle, said adjuster mechanism including an extendable strut that is located between a first web of a first brake shoe and a second web of a second shoe to define a running clearance between said first and second shoes and a drum, said first and second brake shoes being retained on a backing plate that is secured to the vehicle such that a first engagement end of said first web and said second web is aligned with an anchor on said backing plate and a second engagement end is spaced apart by an actuator member, a first spring attached to said first and second webs urges the first engagement ends toward said anchor while a second spring is attached to a pawl of said adjuster mechanism that is retained on said first web and said second web urges said second engagement ends toward said actuator member such that said first and second brake shoes are positioned with respect to said drum to define said running clearance when said actuator is in a rest position, said actuator responding to an input force by acting on said first and second webs in opposition to said first and second springs and moving said first and second brake shoes through said running clearance and into engagement with said drum to effect a brake application, said adjuster mechanism including a shaft with a star wheel located between a first threaded section and a smooth section, said smooth section being retained in a bore of a first body of said extendable strut while said first threaded is mated a second threaded section in a second body of said extendable strut, said pawl pivoting on said first web with movement of said first web with respect to said actuator and rotating said star wheel when a predetermined pivotal movement occurs correspondingly rotate said first threaded section with respect to said second threaded section causing said extendable strut to expand and maintain said running clearance, said star wheel being characterized by a plurality of teeth while said pawl is characterized by a base with a first slot for receiving a pivot pin secured to said first web for securing said base to said first web, an opening for receiving said first end of said second spring, a second slot for receiving a first end of said first body of said extendable strut and an arm extending from said base to align a first blade thereon in perpendicular alignment with a first tooth of said plurality of teeth on said star wheel and to align a second blade thereon in a plane that is substantially parallel with a pitch of a second tooth of said plurality of teeth on said star wheel, said first blade engaging said first tooth when lever and first web are in said rest position while said second blade is offset a distance from said second tooth, said base pivoting on said pivot pin during a brake application with movement of said first web and when said web has moved toward said drum a predetermined distance said lever will have pivoted through a predetermined angle such that first blade slides past said first tooth and moves into engagement with a third tooth adjacent said first tooth while said second blade moves through said offset distance and into engagement with said second tooth such that said lever is now locked into engagement with said star wheel and first blade is prevented from moving past said third tooth and when said lever returns to said rest position said first blade now engages said third tooth to rotate said star wheel an increment defined by the pitch of said plurality of teeth as said second blade moves away from said star wheel said offset distance.

2. The actuator mechanism as recited in claim 1 wherein after said second blade engages said second tooth with any further pivotal movement said pawl and star wheel move together.

3. The actuator mechanism as recited in claim 2 wherein said rotation of said star wheel by engagement of said first blade with said third tooth as said pawl returns to a position of rest is limited to a single increment no matter how far said lever and star wheel may have rotated after such engagement.

4. The actuator mechanism as recited in claim 1 wherein said first blade is separated from said second blade by a distance that is greater than the arcuate length between said first tooth and said second tooth by less that the arcuate length between second tooth and said third tooth.

5. The actuator mechanism as recited in claim 2 wherein said rotation of said star wheel is limited to said increment to prevent an over adjustment of said running clearance caused by an actuation force being supplied to said actuator to move said first web.

6. The actuator mechanism as recited in claim 1 wherein an extension of said extendable strut is limited to a single arcuate length of a tooth for each brake application.

* * * * *